United States Patent [19]
Conwicke
[11] 3,849,142
[45] Nov. 19, 1974

[54] BARIUM- OR STRONTIUM-CONTAINING GLASS FRITS FOR SILVER METALLIZING COMPOSITIONS

[75] Inventor: Joel A. Conwicke, Youngstown, N.Y.

[73] Assignee: E. I. du Pont de Nemours and Company, Wilmington, Del.

[22] Filed: Dec. 13, 1972

[21] Appl. No.: 314,602

[52] U.S. Cl. .................. 106/1, 117/124 C, 117/227, 252/514
[51] Int. Cl. .................. C09d 5/24
[58] Field of Search .............. 106/1; 117/124 C, 227; 252/514

[56] References Cited
UNITED STATES PATENTS

| | | | |
|---|---|---|---|
| 2,822,279 | 2/1958 | Larsen et al. | 106/1 |
| 3,413,240 | 11/1968 | Short | 106/1 |
| 3,440,062 | 4/1969 | Hoffman | 106/1 |
| 3,440,182 | 4/1969 | Hoffman | 106/1 |

*Primary Examiner*—Lorenzo B. Hayes
*Attorney, Agent, or Firm*—James Farstner

[57] ABSTRACT

Silver metallizing compositions comprising barium or strontium-containing frits for fusion to the surface of a ceramic body. Also included are patterns formed from the metallizing compositions and fused to the surface of ceramic bodies. $CdO/BaO/B_2O_3/SiO_2$ or $CdO/SrO/B_2O_3/SiO_2$ represent preferred compositions. Ternary compositions in which either $B_2O_3$ or $SiO_2$ are deleted from the preferred quaternary systems also provide workable and adequate frits. These frits, combined with $Bi_2O_3$, give binders for metallizing compositions. Such metallizing compositions result from mixing these binders with noble-metal powders and a liquid vehicle. The metallizing compositions may then fuse to surfaces of ceramic bodies.

5 Claims, No Drawings

BARIUM- OR STRONTIUM-CONTAINING GLASS FRITS FOR SILVER METALLIZING COMPOSITIONS

BACKGROUND OF THE INVENTION

This invention relates to barium- or strontium-containing frits, binders, and noble-metal compositions, and to ceramic bodies with these compositions fused to their surfaces.

Noble-metal compositions of finely divided particles of a noble metal and a vitreous binder dispersed in a liquid vehicle have found use in preparing fired-on metal coatings on ceramic objects. The metallic patterns should adhere well to the ceramic body. These patterns must also accept solder, preferably without first burnishing or copper plating, in order to allow connection to metallic elements, for example in a circuit.

Various frits have found use in preparing metallizing compositions. U.S. Pat. No. 2,385,580 of Sept. 25, 1945, to J. J. Knox discloses a lead borosilicate frit for use in a binder with bismuth trioxide. D. O. Koch, in his U.S. Pat. No. 2,457,158 of Dec. 28, 1948, reveals a lead titanium borosilicate frit. O. A. Short's U.S. Pat. No. 2,819,170, of Jan. 7, 1958, reveals a cadmium borate glass frit. U.S. Pat. No. 2,822,279 issued on Feb. 4, 1958 to W. R. Larsen et al. teaches the use of an alkali metal-cadmium borate frit in a binder. M. E. Demesnil's U.S. Pat. No. 2,942,992 of June 28, 1960, discloses an alkali metal-bismuth borosilicate frit. U.S. Pat. No. 3,350,341 issued on Oct. 31, 1967, to O. A. Short teaches the use of a frit having PbO, $PbF_2$, and $B_2O_3$. All of the above patents state that the addition of minor amounts of other materials will not deleteriously affect the particular frit. All, except the last patent, state that the inclusion of a minor amount of barium oxide in particular will not destroy the useful properties of these frits.

All of the above frits have provided metallizing compositions showing improved adhesion and solder acceptance or wettability. However, the search continues for further frits possessing even better characteristics than those presently known.

SUMMARY OF THE INVENTION

Frits having the quaternary composition of BaO, CdO, $SiO_2$, and $B_2O_3$ have shown improved solder wettability and adhesion to substrate surfaces. Frits have the ternary compositions of either CdO, BaO and $B_2O_3$ or CdO, BaO and $SiO_2$ have also produced desirable results when placed in metallizing compositions for firing on substrates.

In one facet, the frits consist essentially of CdO; BaO, SrO or a mixture of BaO and SrO; and $B_2O_3$, $SiO_2$ or a mixture of $B_2O_3$ and $SiO_2$. Alternatively, the frit, in addition to other possible ingredients, may include about 8 to 65 percent of SrO, BaO, or a combination of SrO and BaO; 15–75 percent of CdO; and 3–45 percent of $B_2O_3$, $SiO_2$ or mixture of $B_2O_3$ and $SiO_2$ but with an upper limit of about 30 percent for either the $B_2O_3$ or the $SiO_2$. The binder prepared from the barium- or strontium-containing glass frit may comprise about (a) 25–80 percent of $Bi_2O_3$; and (b) 17–75 percent of the glass frit having approximately 8–65 percent BaO, SrO, or the mixture of BaO and SrO. Alternatively, the binder consists essentially of (a) $Bi_2O_3$; and (b) a glass frit with BaO, SrO, or the mixture of BaO and SrO.

The binders may find use in noble-metal compositions which consist essentially of the binder, the glass frit, a liquid vehicle, and a noble-metal powder. Alternatively, the noble-metal compositions include about 2–10 percent of $Bi_2O_3$; 2–6 percent of the frit having the 8–65 percent BaO or SrO or both; 15–70 percent of a liquid vehicle; and 35–85 percent of a noble-metal powder.

After placing the noble-metal compositions on a ceramic body, firing produces adherence of the metal compositions to the substrate surface. This causes the compositions to lose their vehicle while becoming firmly fused to the surface.

DETAILED DESCRIPTION OF THE INVENTION

Noble-metal compositions have found many uses, including decorative purposes, conductors, resistors and other components in printed circuits, and other electronic applications. Silver commonly forms part of the electrodes for disc capacitors and end terminations for multi-layer capacitors. The silver is applied to the fired ceramic substrates that form the capacitor's dielectric in the form of particulate silver dispersed in an organic carrier or other liquid vehicle. However, silver alone does not adhere to the ceramic after firing. Thus, the silver compositions include inorganic binders which bind the silver metallization to the capacitor substrate or dielectric during firing. A glass frit forms an essential element of these binders.

Glass frits having the quaternary composition of BaO, SrO, or a mixture of BaO and SrO; CdO; $B_2O_3$; and $SiO_2$ provide noble-metal compositions which improve adhesion to ceramic bodies and display excellent solderability. While these quaternary systems represent the preferred frits, glasses having the ternary compositions similar to these quaternary compositions except with the omission of either $B_2O_3$ or $SiO_2$ also display the desired adhesion and solder acceptance.

The improved properties obtained with silvercompositions containing these frits apparently derive from both the frits observed capability to wet ceramic bodies, especially over the temperature range of 720° to 870°C., and their noted lower temperature coefficient of viscosity. Enhanced frit adhesion may result from the greater wetting capability.

Further, glasses displaying high fluidity at the firing temperature and incapable of wetting the ceramic surface, will migrate and glaze or coat the metallic surface. The resulting presence of the glass on the electrode surface would hinder solder acceptance, and the absence of the glass between the electrode and the ceramic would obviate its acting as a binder between the two. These factors may count for the superior performance of the barium- or strontium-containing frits.

Generally, the glasses should include, by weight, about 8–65 percent of BaO, SrO, or a mixture of BaO or SrO; 15–75 percent of CdO; and 0–30 percent of $B_2O_3$ and 0–30 percent of $SiO_2$, with the total amount of $B_2O_3$ and $SiO_2$ lying in the range of about 3–45 percent. Preferably, the frits containing about 15–60 percent of BaO, SrO, or a mixture of the two; 25–60 percent CdO; 10–25 percent of $B_2O_3$ and 10–25 percent of $SiO_2$ with the total of the $B_2O_3$ and $SiO_2$ lying within the range of 15–40 percent. The batch compositions to make these frits may include, for example, 10–70 percent of $BaCO_3$, 10–70 percent of CdO, 0–40 percent $H_3BO_3$, 0–30 percent of $SiO_2$ with the total of $H_3BO_3$ and $SiO_2$ lying in the range of 5–55 percent. In addition to the carbonate, other alkaline-earth compounds suffice besides the oxide, including nitrates or any other compounds that will revert to the oxide upon heating to make the frit. The fluoride represents a possible, though less preferred, alternative.

Typically, to make the frit, the ingredients of the batch composition are first mixed together. Subsequently, melting the ingredients and pouring them with water produces the fritted material which then undergoes ball milling.

The frit may include minor amounts of impurities or optional constituents. However, in general, this should not cause the amounts of the required components to vary outside of the stated ranges. PbO, ZnO, $TiO_2$, $Al_2O_3$, $P_2O_5$, $Y_2O_5$, rareearth oxides, and alkali oxides represent examples of ingredients commonly added to glasses as discussed generally in "The Constitution of Glasses" Parts I and II, by W. A. Weyl and R. C Marboe (John Wiley & Sons, New York, 1967).

Combining $Bi_2O_3$ with a frit gives a binder that serves to promote adhesion between the silver and the ceramic. Additionally, the $Bi_2O_3$ improves the solder acceptance of the fired electrode composition. While the mechanism for this remains in doubt, $Bi_2O_3$ may flux the frit component, that is, cause it to melt or soften at a lower temperature. Or, the $Bi_2O_3$ may react with the metal to give a metal-bismuth alloy film which shows greater solder acceptance than silver alone.

The binder generally includes, by weight, about 25–83 percent of $Bi_2O_3$ and about 17–75 percent of the glass frit. Moreover, the $Bi_2O_3$ need not be added in this form; any form which, upon firing, yields $Bi_2O_3$ will suffice. This includes, amongst others, bismuth subnitrate. When using some form of bismuth other than bismuth trioxide, the amount mixed with the frit should, upon firing, yield sufficient $Bi_2O_3$ to fall within the stated range. Preferably, the binder contains about 73–83 percent of the $Bi_2O_3$ and about 17–27 percent of the frit. The binder should generally have a particle size of 20 mesh or finer, perhaps going down to the size of 100 mesh or smaller.

The binder, when mixed with a noble-metal powder and a liquid vehicle, gives a noble-metal composition suitable for printing and firing. Noble-metal compositions generally include about 35–85 percent of a noble metal, 2–10 percent of $Bi_2O_3$, 2–6 percent of the frit, and 15–70 percent of a liquid vehicle. Preferably, the ingredients appear in the amounts of about 45–60 percent of silver; 8–10 percent of $Bi_2O_3$, 2–3 percent of the frit, and 30–45 percent of the vehicle.

The noble metal within the composition generally appears as elemental metal. However, any form which will convert to the elemental metal during firing suffices. Upon the use of the metal in a non-elemental form, the amount included within the composition must give the elemental noble metal in a quantity falling within the stated ranges. The metal particles should generally pass through a 20 mesh screen or smaller.

Silver represents the preferred noble metal since it finds wide use in the electronics industry. Elemental silver particles, silver oxide, or silver carbonate perform satisfactorily in the noble-metal composition.

Suitable ceramics or substrates include glasses, such as lime-silicate, borosilicate, and metal-borosilicate glasses as well as colored and optical glasses; china, porcelain, and other vitrifiable clays; and vitreous dielectric materials such as mica and steatite porcelain. Capacitor bodies represent frequently used substrates, and normally contain major quantities of barium titanate or titanium dioxide, which dominate the dielectric property of the capacitor. It may also contain a number of modifying additives such as bismuth stannate and rare-earth oxides. In making these capacitor bodies, the powder ingredients are mixed together, dried pressed into the form of a disc, and sintered at high temperatures, generally in the range of 1,300°–1,400°C., to form a dense ceramic. W. W. Coffeen discusses these in general in J. Am. Cer. Soc. 37, 480 (1954).

The liquid vehicle holds the mixture of the noble metal and binder particles together, and permits the facile application of the composition to a substrate. The liquid should generally avoid substantial chemical reaction with the binder or metal particles, and also should not interfere with the production of metallic silver during firing. Many liquids satisfy these general limitations and have, in fact, seen service.

Many methods will satisfactorily apply the noble-metal composition to the ceramic object or substrate. These include spraying, brushing, dipping, banding, or screen or stencil printing. The method of application and the thickness of the desired coating will influence the proportion and type of liquid vehicle in the composition.

The firing of the noble-metal composition should generally not commence until the coating on the substrate has dried. Air drying suffices where the liquid vehicle volatilizes at room temperature. In fact, this may suggest the use of such a liquid vehicle. Under other circumstances, dry air currents or mild baking at elevated temperatures may be required.

The temperature of the actual firing must suffice to fuse the binder of the noble-metal composition to the ceramic substrate. The temperature of the firing should generally remain below the point at which the substrate will deform. Otherwise, the firing need only proceed at a temperature and for a time period that will effect a firm bond between the composition and the substrate. Generally, firing between 720°C. to 870°C. sinters the metal and allows the glass phase to interact with the substrate. The firing produces the desired adherent, solderable, and conductive layer on the substrate.

The drying and firing affects evaporation of the vehicle from the metal composition in addition to bonding the remaining components to the ceramic substrate. Further, parts of the noble metal, binder, or frit may also volatilize, such as carbon dioxide where a carbonate is used rather than an oxide. For example, firing will cause barium carbonate to become barium oxide with the concomitant loss of $CO_2$. After the firing, the noble-metal composition, firmly fused to the ceramic surface will generally include about 68–95 percent of a noble metal, 2–20 percent of $Bi_2O_3$, and 2–14 percent of the barium- or strontium-containing frit. The preferred amounts of these ingredients lie in the ranges of 78–86 percent of silver, as the noble metal, 11–18 percent of $Bi_2O_3$ and 2.5–5 percent of the frit containing about 15–60 percent BaO, 25–60 percent CdO, and 10–25 percent of $B_2O_3$ and 10–25 percent of $SiO_2$ with the total amount of $B_2O_3$ and $SiO_2$ lying within the general range of 15–40 percent.

EXAMPLES

A series of glass frits were prepared and compared to a control frit which has seen common use and which contains substantially no BaO or SrO. Silver compositions incorporating these frits, including the control frit were printed and fired on a variety of dielectric bodies. The silver composition contained about 50 percent by weight of silver powder, 9 percent $Bi_2O_3$, 2.24 percent of the frit in each case, with a vehicle constituting the remainder. The vehicle had a composition of about 10 percent by weight of ethyl cellulose and 90 percent of a mixture of α- and β-terpineol isomers sold by Tenneco. The control frit by comparison contained substantially no barium or strontium and was an alkali metal-cadmium borosilicate frit as discussed in Larsen's U.S. Pat. No. 2,822,279.

These silver-metallizing compositions, with the different frits, were printed on different types of dielectric bodies, with a sample size of approximately 10 chips in each case. After firing for approximately eight minutes at peak temperature, leads were attached to the printed metal by first dipping the ceramic bodies in Dutch Boy 115 rosin flux and then dipping the bodies for 4 seconds into a solder bath at 220°C. containing 62 percent by weight Sn, 36 percent Pb, and 2 percent Ag. The leads were pulled with a Chatellon Tensile Tester sold by John Chatellon & Sons, New York, giving adhesion values in pounds. In these examples, as above, the compositions are indicated in percentages by weight.

EXAMPLE 1

A batch composition having 38.4 percent of CdO, 22.7 percent $H_3BO_3$, 17.0 percent of $SiO_2$, and 21.9 percent of $BaCO_3$ upon fritting, gave a glass frit having 45.0 percent CdO, 15.0 percent of $B_2O_3$, 20.0 percent of $SiO_2$, and 20.0 percent of BaO. Metallizing compositions having the ingredients indicated above with both the control frit and the barium frit were fired at a temperature of 815°C. on a variety of ceramic Temperature Compensating Discaps generally composed of $TiO_2$ and obtained from the Radio Materials Company division of P. R. Mallory and Co. of Chicago. The solder leads gave the following results on the Chatellon pull tester:

| CERAMIC | CONTROL (lbs.) | EX. 1 (lbs.) |
|---|---|---|
| N750 | 3.4 | 5.6 |
| N470 | 6.0 | 6.4 |
| N330 | 6.5 | 7.7 |

Solderability appeared improved for the composition with the barium-containing frit as compared to the control composition. To compare the wetting behavior, these compositions were printed and fired on N750 ceramic disc and placed in a gradient furnace for 10 minutes, where the furnace had a gradient of 75°C. per inch between 700°C. and 1,000°C. The composition with the control frit wet the substrate at temperatures below 790°C. and then dewet, forming isolated glass islands. The composition with the barium frit wet the substrate throughout the temperature range and gave a shiny glazed appearance. Thus, the barium composition demonstrated better wetting of the substrate than the control composition, particularly at temperatures above 790°C.

EXAMPLE 2

The fritting of a batch composition containing 24.0 percent CdO, 14.4 percent of $H_3BO_3$ and 61.6 percent $BaCO_3$ gave a glass having 28.0 percent CdO, 16.6 percent $B_2O_3$, 55.4 percent $BaCO_3$. After firing at 760°C., compositions with the control frit and barium frit showed the following adhesion to ceramic bodies:

| CERAMIC | CONTROL (lbs.) | EX. 2 (lbs.) |
|---|---|---|
| K200 | 7.5 | 10.4 |
| N1500 | 8.1 | 9.4 |
| NOP | 8.0 | 9.0 |
| K6500 | 9.1 | 10.0 |

Solderability appeared excellent for both compositions. The same silver compositions were fired at 870°C. on other ceramics and the leads soldered to them displayed the following adhesion values:

| CERAMIC | CONTROL (lbs.) | EX. 2 (lbs.) |
|---|---|---|
| $Al_2O_3$ | 7.7 | 9.1 |
| K2000 | 6.8 | 10.7 |
| N1500 | 8.9 | 9.9 |
| NPO | 8.4 | 10.7 |
| K6500 | 6.6 | 7.4 |

EXAMPLE 3

A frit having 39.6 percent CdO 20.2 percent $B_2O_3$, 40.2 percent BaO was prepared from a batch composition having 31.2 percent CdO 28.2 percent $H_3BO_3$ and 40.6 percent $BaCO_3$. Compositions with this frit and the control frit were fired on ceramics at 870°C. with the following results:

| CERAMIC | CONTROL (lbs.) | EX. 3 (lbs.) |
|---|---|---|
| N750 (1) | 11.5 | 12.3 |
| $Al_2O_3$ | 7.7 | 10.9 |
| K2000 | 7.5 | 10.4 |
| N750 (2) | 8.2 | 11.1 |
| NPO | 8.0 | 13.0 |

Solderability appeared excellent for both compositions.

EXAMPLE 4

After fritting, the glass batch composition of 44.7 percent CdO, 29.3 percent $H_3BO_3$ and 26.0 percent of $BaCO_3$ gave a frit of 54.7 percent CdO, 20.3 percent $B_2O_3$, and 25.0 percent BaO. Compositions with this barium and the control frits were fired on ceramics at 870°C. and displayed the following adhesion values:

| CERAMIC | CONTROL (lbs.) | EX. 4 (lbs.) |
|---|---|---|
| K7000 | 9.4 | 11.0 |
| $Al_2O_3$ | 7.7 | 9.7 |
| Ni500 | 8.9 | 12.1 |
| K1800 | 9.8 | 16.1 |

What is claimed is:

1. In a noble-metal composition comprising
35–85 percent of a noble-metal powder;
15–70 percent of a liquid vehicle;
2–10 percent of $Bi_2O_3$; and 2-6 percent of a glass frit binder: the improvement comprising, as said binder, a glass frit consisting essentially of, 8-65 percent BaO or SrO or a mixture of BaO and SrO;

15-75 percent CdO; and 3-45 percent of $B_2O_3$ or $SiO_2$ or a mixture of $B_2O_3$ and $SiO_2$, the amount of either said $B_2O_3$ or said $SiO_2$ not exceeding about 30 percent.

2. The composition of claim 1 wherein a. said noble-metal powder is silver and is present in an amount of about 45-60 percent;

b. said liquid vehicle is present in an amount of about 30-45 percent;

c. said $Bi_2O_3$ is present in an amount of about 8-10 percent; and d. said frit is present in an amount of about 2-3 percent and includes about:

1. 15-60 percent of said BaO;
2. 25-60 percent of said CdO; and
3. 10-25 percent of said $B_2O_3$ and 10-25 percent of said $SiO_2$, the total amount of said $B_2O_3$ and said $SiO_2$ being in the range of about 15-40 percent.

3. A ceramic body having firmly fused to its surface a noble-metal composition according to claim 1.

4. A ceramic body having firmly fused to its surface the composition according to claim 2.

5. A ceramic body of claim 4 wherein said body is composed of a preponderant amount of barium titanate or titanium dioxide.

* * * * *